(No Model.) 2 Sheets—Sheet 1.
H. E. MARCHAND.
MEASURING DEVICE FOR OIL TANKS.
No. 245,850. Patented Aug. 16, 1881.
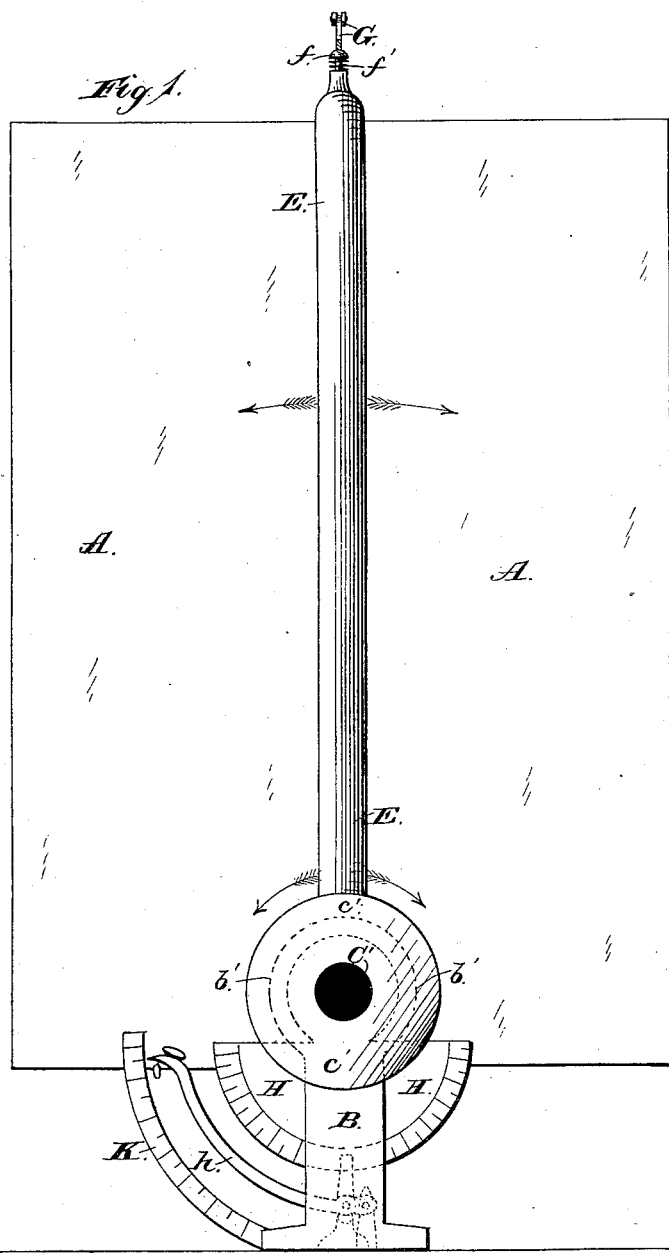

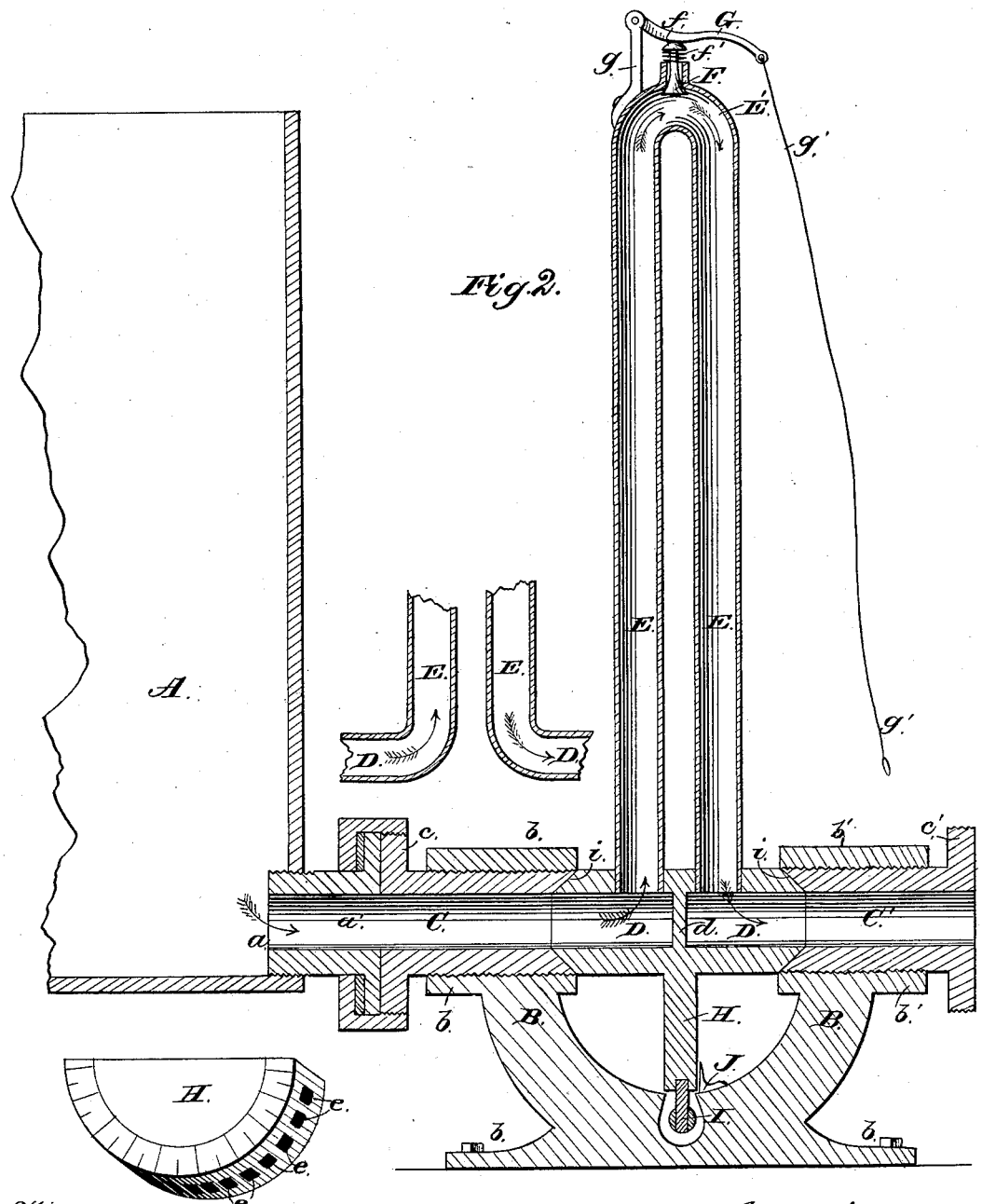

UNITED STATES PATENT OFFICE.

HENRY E. MARCHAND, OF PITTSBURG, ASSIGNOR OF TWO-THIRDS TO WILLIAM J. BECKFELD AND JACOB C. LANGE, SR., BOTH OF ALLEGHENY, PA.

MEASURING DEVICE FOR OIL-TANKS.

SPECIFICATION forming part of Letters Patent No. 245,850, dated August 16, 1881.

Application filed June 9, 1881. (No model.)

*To all whom it may concern:*

Be it known that I, HENRY E. MARCHAND, a citizen of the United States, residing at Pittsburg, in the county of Allegheny, State of Pennsylvania, have invented new and useful Improvements in Liquid-Measures, of which the following is a specification.

This invention relates to an apparatus for measuring liquids—such as oils, &c.—while they flow from a tank to a pipe-line, the object being to provide a measuring tube or tubes that may be set to automatically draw off the contents of the tank in any definite predetermined quantity, as indicated upon a suitable dial; and the invention consists, first, in a double return pipe or tube pivoted in a suitable valve-seat between the tank and pipe-line, and adapted to be swung or turned to the right or left so as to raise or lower the upper portion of the double tube to a point above or below the level of the liquid in the tank, whereby its flow therefrom through said tube is controlled; second, in the combination, with a swinging tube arranged between a tank and pipe-line for the passage of liquid from said tank, of an eccentric dial-plate attached to the lower end of the pipe, whereby the pipe is set to the proper angle to draw off a definite quantity of liquid; third, in the combination, with an adjustable tube or tubes arranged between a tank and pipe-line, and having a dial-plate provided with an indicating-arm, of a quadrant or sector adapted to indicate the quantity of liquid to be drawn; and it also consists in certain details of construction, as hereinafter more fully set forth.

In the drawings, which fully illustrate the invention, Figure 1 is a front view of my apparatus in position. Fig. 2 is a vertical section.

Similar letters of reference indicate corresponding parts in the several views.

The letter A represents an oil-tank, having an outlet, $a$, located at the bottom on one side, which is provided with a flanged pipe or half-union, $a'$. On the outside of the tank is a stand, B, which is secured by bolts $b\ b$ to any suitable support, and consists of upwardly-curved arms, carrying at their tops the short horizontal pipes $b'\ b'$, which receive the pipes C C', that are screwed therein. The pipe C is provided with a half-union, $c$, which connects with the pipe or joint $a'$ at the outlet of the tank, and the pipe C' is provided with a similar half-union, $c'$, that connects with a pipe-line. The inner or opposite ends of the pipes C C' are ground or beveled inward to form a seat for the reception of the beveled ends of a horizontal pipe, D, which is divided transversely by a partition, $d$. On each side of this partition, at the upper part of the pipe D, are openings for attachment of the vertical pipes E E, which are connected at their upper ends by a bend, E'. If desired, the pipes E and bend E' may be made in one piece. At the top of the bend E' is an opening, which is governed by a valve, F, which consists of a tapering plug having its outer projecting end provided with a button, $f$, and surrounded by a coiled spring, $f'$. A lever, G, pivoted to an arm, $g$, on the bend, is provided at its other end with a cord, $g'$, by which it may be pressed down upon the button $f$, so as to open the valve, the tension of the spring $f'$ serving to close it when required.

To the lower part of the horizontal pipe D is attached a dial-plate, H, the edge or rim of which is provided with notches $e\ e$ to engage with a thumb-screw, I, arranged beneath the dial in the center of the stand B, and by which the dial H and pipes D E are held at any desired angle. The outer side of the dial H is graduated in any suitable manner to indicate definite quantities of liquid-measure, as shown by an index, J, secured to the stand B. The dial H is attached eccentrically to the pipe D, so as to engage with a lever, $h$, and cause it to rise and fall to indicate quantities marked upon the sector K. By this means, when the pipes D E are adjusted or set in their bearings or seats $i$, the dial-plate H may be used to indicate large quantities and the sector K to indicate smaller ones.

It will be seen that when the pipes E are raised vertically above the level of the oil in the tank none will flow therefrom. If, however, it is desired to draw any quantity of oil from the tank, the pipes D E are turned to the required angle, as indicated upon the dial and sector, when the oil will automatically flow until it reaches the level of the oil in the highest point of the tubes E, any tendency to siphonage being obviated by the action of the valve F.

I do not confine myself to the precise details of construction as hereinbefore described, as it is obvious that they may be varied in many particulars without departing from the spirit of my invention, which consists, essentially, in drawing off the contents of a tank by means of a vertically adjustable or swinging pipe or pipes arranged between the tank and pipe-line, and adapted to operate, in connection with suitable dials, to govern and indicate the quantity of liquid drawn.

The partition in the horizontal pipe D may be dispensed with, and said pipe made in two pieces, forming bends or parts of the vertical pipes E E, or the entire pipe, including the upper bend, may be made in one piece, the operation being in every respect similar to that described. By turning the pipes C C' their connection with the pipe or pipes D may be tightened, so as to afford a firm support.

This apparatus will enable a single attendant or gager to manage a large number of tanks with but little trouble, as it is only necessary to set the measuring-tubes E E to the proper angle of inclination, as indicated upon the dial, when they will perform their proper functions without the need of watching.

Having thus described my invention, what I claim, and desire to secure by Letters Patent, is—

1. In an apparatus for automatically measuring liquids while being drawn from a tank to a pipe-line, a double return pipe or tube pivoted in a suitable seat or bearings between the tank and pipe-line, and adapted to be inclined to the right or left, whereby its upper end is raised or lowered to govern the flow of liquid from the tank, substantially as described.

2. In a liquid-measuring apparatus for automatically controlling the flow of liquids while being drawn from a tank to a pipe-line, the combination, with an adjustable double return pipe or tube pivoted in a suitable seat or bearings between the tank and pipe-line, of a dial-plate attached to the lower end of said pipe, whereby it is set to the proper angle to draw off a definite quantity of liquid, substantially as described.

3. In an automatic liquid-measuring apparatus, the combination, with an adjustable double return-pipe or discharge-tube having a dial attached thereto, of an indicating arm or arms and a sector adapted to indicate the quantity of liquid to be drawn, substantially as described.

In testimony whereof I have hereunto set my hand in the presence of the subscribing witnesses.

H. E. MARCHAND.

Witnesses:
MARSHALL JOHNSTON,
S. HARVEY THOMPSON,
JOHN F. EDMUNDSON.